UNITED STATES PATENT OFFICE.

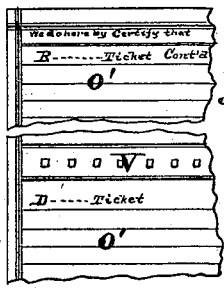

FREDRICK W. BARRETT, OF SPRINGFIELD, OHIO, ASSIGNOR TO THE BARRETT PUBLISHING COMPANY, OF SAME PLACE.

TALLY-SHEET.

SPECIFICATION forming part of Letters Patent No. 460,518, dated September 29, 1891.

Application filed April 1, 1889. Serial No. 305,542. (No model.)

*To all whom it may concern:*

Be it known that I, FREDRICK W. BARRETT, a citizen of the United States, residing at Springfield, in the county of Clark and State of Ohio, have invented certain new and useful Improvements in Tally-Sheets, of which the following is a specification, reference being had therein to the accompanying drawings.

This invention relates to certain new and useful improvements in books in which to tally and record the number of votes cast at popular elections, and the essential feature consists in the provision of such an arrangement and folding of the sheets that the matter recorded on one page can be readily continued on the next page, the sheets being so ruled as to accommodate the statistics consequent upon the appearance in the field of from the smallest to the large and extensive number of candidates, as well as those consequent upon various parties having candidates in the field.

The construction of the book will be hereinafter more fully described, and pointed out in the claims.

In the accompanying drawings, forming a part of this specification, and on which like reference-letters indicate corresponding parts, Figure 1 represents a view of a portion of one of the tally-sheets, with the lower corner carried and turned up to exhibit a continuation of the space intended to be occupied by the same party and its candidates; Fig. 2, a similar view, with the turned-up sheet in Fig. 1 carried on over and up and exhibiting the commencement of another space to accommodate an opposing party and its candidates; Fig. 3, a view of the book entire spread open, with a summary-sheet in view and the "office" and "name" columns of a tally-sheet appearing at one side of such summary-sheet; and Fig. 4, a fragmentary view of a summary-sheet, showing the same divided between two opposing parties.

The letter A designates a series of sheets of paper, of which there are as many as may be desired in making a particular book. These sheets are stitched from the point B, Fig. 1, to a suitable point across their center on the line C, preferably to the line G. Sheets can be folded on the line of such stitching, which is transverse or crosswise the book. The perpendicular dotted lines D, D', E, and F and the full lines G in Fig. 3 designate the point where the book is folded so as to occupy a small compass when not being used and in a closed condition, the shorter and upper sheets, as viewed in Fig. 3, being folded on the line E, which is about half-way between their edge T and the line G, and the larger and longer sheets folded on the line D', which is about half-way between the line D and the line G. Each sheet is ruled with a column H, in which is designated the "office," and a column I, in which are designated the names of the "candidates," as clearly shown in Fig. 1 by the fictitious name. The sheets are further ruled with a series of cross-lines J, constituting squares or spaces, in which tally-marks are made in the usual way, each space being filled with a group of such marks, usually five. The column H on the sheet appearing in Fig. 1 is continued on the rear or under side of the lower half of said sheet, as seen at H', and the column I is so continued, as seen at I', and the lines J are also duplicated on the said under side of said lower half of such sheet. From this it will be observed that the column H runs down the sheet on one side and runs over on the other side down to the horizontal folding-line C. This is clearly shown in Fig. 2, wherein the lower half of the sheet principally shown in Fig. 1 has been turned or carried entirely over and upward to exhibit the full length of the columns H' and I' continued, and also the lines J. It will also be observed that the lower half of Fig. 2 is composed of one-half of another sheet having similar columns K' and L' and similar ruling M'. This sheet is for the use of another party, as suggested by bearing the initial letter "D" instead of "R." When this portion (shown in Fig. 2) is lifted up and turned back upon the portion K', I', and J', the lines will exhibit an exact duplicate to the full sheet shown in Fig. 1, save that the columns thus presented will be in continuation of the columns K' and L' for the use of the same party that starts with K' and L'. Thus it will be understood that the two parties represented by the initial letters "R" and "D" will be provided with columns for offices and candidates and with squares for tallying, which will occupy one entire side of a sheet or page and one-half of the reverse side of the same sheet or page. The same is true as regards the accommodation afforded any other party or parties, whose offices and candidates may be designated on other sheets of the book. This arrangement affords so large an area for the designation of offices, the names of candidates, and the checking or tallying of votes, as to accommodate the necessities of popular elections, at which the offices and candidates are usually and most exceptionally excessive and the parties numerous, while the book is convenient, no matter how small a number of offices and candidates is presented and how few the parties in the field. My recent experience in popular elections has shown the necessity of a provision of this kind.

Referring now to Fig. 3, it will be seen that blank columns O' are afforded for the names of candidates, blanks P' for the written number of votes cast, blanks Q' for the figures representing such number of votes, and blanks R' for the designation of offices, as well as blanks on the extreme margin S', in which the judges of the election and clerks attest with their signatures the legality and accuracy of the entries made. These sheets are called "summary-sheets," and some of them are divided so that the upper half of one sheet or page is for one party, while the lower half of the same is for another party, as seen in Fig. 4. This arrangement corresponds with that already described in reference to the tally-sheets—that is to say, the blanks O', P', Q', R', and S', as shown in Fig. 3, and which are for one party, are continued on the upper half of the opposite side of that sheet or page, as seen in Fig. 4. Again, the lower half of the summary-sheet shown in Fig. 4 is for another party and is continued, as regards the blanks, on the opposite side of the sheet and across the entire page, just as shown in Fig. 3, and as described in respect to the tally-sheets. These summary-sheets are secured to the tally-sheets in any convenient way, and preferably at a distance from the right-hand edge of such sheet, as viewed in Fig. 3, equal to about one-half of the width of the summary-sheets. These summary-sheets are stitched or otherwise secured to each other and to the tally-sheets upon the folding-line G, and in speaking of a page or sheet I refer to the surface exhibited at either side of such folding-line G and comprehended between the lines T and U. The space occupied by the square figures V is simply a fanciful division between the upper and lower halves of the summary-sheets or pages, so as to more clearly divide the space to be occupied by the different parties, as suggested in Fig. 4. For uniformity in the appearance of the summary-sheets this same division is preferably printed on all of the summary-sheets, whether such will be occupied entirely or only partly by the same party. This matter, however, is of no special importance.

It will now be understood that the book consists of tally-sheets secured together by a transverse row of stitches or by other means on a transverse line, and are ruled with the blanks hereinbefore described and capable of folding in transverse lines, and of summary-sheets stitched or otherwise secured to the tally-sheets and to each other in a vertical line and capable of folding in a vertical line. It will also be understood that the tally-sheets are folded or spread out flat in use from said transverse line, so as to present an up-and-down continuation of the columns, &c., to the person using the book. In tallying one ballot, after one tally-mark has been made opposite each of the names on the page then the lower half of such sheet is carried upward and over, as already described, and the continuation columns presented upward, and one-half the new page thus exposed is used entirely or partly, as occasion may require. The remaining one-half of this page is used for another party and its statistics carried on over and upon the next succeeding page, the whole of which may or may not be used for said party, according to circumstances. The summary-sheets are likewise used for both or all of the parties, and in transferring the statistics from the tally-sheets to the summary-sheets in a summarized form the summary-sheets are placed in the position shown in Fig. 3, so as to cover the cross-lines J and present the name of the candidate on such summary-sheet in line with the same name on the tally-sheet. It will now be understood that the tally-sheets can be folded back on the transverse central line, while the summary-sheets may be folded on vertical lines. These various lines of folding give the book a peculiar adaptation to its purpose and render its manipulation convenient and rapid.

Having thus fully described my invention, what I claim as new, and desire to secure by Letters Patent, is—

1. As an improved article of manufacture, a book for recording the votes cast at popular elections, the same consisting of tally-sheets having blanks for offices, candidates, and tallying of one party on one side, the said blanks being continued from said side onto the opposite side of said page, and of summary-sheets having blanks for candidates, the number of votes cast, and for offices of one party on one side, the said blank also being continued from said side onto the opposite side of said page.

2. As an improved article of manufacture, a book for recording the votes cast in popular elections, the same consisting of a number of tally-sheets secured together in a line running crosswise the book and arranged to be folded on said line and in lines running up and down the book, the said sheets being ruled with blanks for offices, candidates, and tallying, and the said blanks being continued from one page onto and upon one-half of the next page for one party, and similar blanks on the remaining half of said page and which are continued upon the whole of the next page for another party, and of summary-sheets having blanks for candidates, the number of votes cast, and for offices, the said blanks being continued from one page to and upon one-half of the next page for one party and similar blanks on the remaining half of said next page and which are continued upon the entire next page for another party.

3. As an improved article of manufacture, a book for recording the votes cast in popular elections, the same consisting of a number of tally-sheets secured together in a line running crosswise the book and arranged to fold on said line and to fold in lines running up and down the book, and of summary-sheets suitably connected with said tally-sheets and arranged to fold on lines running up and down the book.

4. As an improved article of manufacture, a book for recording the votes cast at popular elections, the same consisting of a number of tally-sheets secured together in a central line running crosswise the book and arranged to fold on said line and on a number of up-and-down folding-lines, and of summary-sheets secured together and to the tally-sheets in an up-and-down direction nearer to one side of the tally-sheets than to the other and having up-and-down folding-lines.

5. In a book for recording the results of popular elections, a tally-sheet having a folding-line running in a transverse direction and ruled with suitable blanks for entering the statistical data for one party on one side thereof and with suitable blanks on more or less of the opposite side thereof to provide for a continuation of the statistical data for the same party.

6. As an improved article of manufacture, a book for recording the votes cast at popular elections, the same consisting of tally-sheets secured together in a line crosswise the book and arranged to fold on said line, and of summary-sheets suitably connected with said tally-sheets and arranged to fold on a line running up and down the book.

7. As an improved article of manufacture, a book for recording the votes cast at popular elections, the same consisting of a number of tally-sheets secured together on a central line running crosswise the book and arranged to fold on said line, and of summary-sheets secured together and to the tally-sheets in an up-and-down direction nearer to one side of the tally-sheets than to the other and having up-and-down folding-lines.

8. In a book for recording the results of popular elections, a tally-sheet having a folding-line running in a transverse direction at about the middle thereof and having several up-and-down folding-lines, said sheet being ruled with suitable blanks on both sides thereof for entering statistical data on one of said sides and for continuing the data onto the opposite side.

In testimony whereof I affix my signature in presence of two witnesses.

FRED. W. BARRETT.

Witnesses:
　WILBER COLVIN,
　WARREN HULL.